US012759324B2

(12) United States Patent
Akatsu

(10) Patent No.: US 12,759,324 B2
(45) Date of Patent: Oct. 13, 2026

(54) PRINTING APPARATUS

(71) Applicant: SEIKO EPSON CORPORATION, Tokyo (JP)

(72) Inventor: Shoji Akatsu, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 148 days.

(21) Appl. No.: 18/494,005

(22) Filed: Oct. 25, 2023

(65) Prior Publication Data

US 2024/0140117 A1 May 2, 2024

(30) Foreign Application Priority Data

Oct. 27, 2022 (JP) ................................ 2022-172032

(51) Int. Cl.
*B41J 15/16* (2006.01)

(52) U.S. Cl.
CPC .................................... *B41J 15/16* (2013.01)

(58) Field of Classification Search
CPC .............................. B41J 2/16508; B41J 15/16
See application file for complete search history.

(56) References Cited

U.S. PATENT DOCUMENTS

2017/0144853 A1* 5/2017 Gonzalez Perello .. B65H 16/06

FOREIGN PATENT DOCUMENTS

JP 2016-203390 A 12/2016
JP 2018-177410 A 11/2018

* cited by examiner

*Primary Examiner* — Jason S Uhlenhake
(74) *Attorney, Agent, or Firm* — WORKMAN NYDEGGER

(57) ABSTRACT

A printing apparatus includes a printing unit configured to perform printing on a medium having an elongated shape, a holding unit including an insertion portion to be inserted into a winding core from an outside in an extending direction of the winding core, the winding core being any one of a first winding core of the medium being wound or a second winding core for winding the medium, a support unit being configured to support the holding unit and having a rail shape for causing the holding unit to move in a moving direction, and a regulation unit configured to regulate movement of the holding unit in the moving direction with respect to the support unit. The regulation unit includes an operation unit and a braking unit configured to sandwich the support unit in a direction intersecting with the moving direction by operating the operation unit.

18 Claims, 5 Drawing Sheets

PRINTING APPARATUS

The present application is based on, and claims priority from JP Application Serial Number 2022-172032, filed Oct. 27, 2022, the disclosure of which is hereby incorporated by reference herein in its entirety.

BACKGROUND

1. Technical Field

The present disclosure relates to a printing apparatus.

2. Related Art

Hitherto, various types of printing apparatuses have been used. Among those, there exists a printing apparatus capable of forming an image on a medium having a roll shape. For example, JP-A-2018-177410 and JP-A-2016-203390 each disclose a printing apparatus including a holding unit that holds a medium having a roll shape and a winding unit that winds the medium on which an image is formed, into a roll shape.

In a case of a printing apparatus including a holding unit that holds a medium having a roll shape, a winding unit that winds the medium on which an image is formed, into a roll shape, and the like, which is similar to the printing apparatuses in JP-A-2018-177410 and JP-A-2016-203390, the apparatus is easily increased in size. Further, in such a printing apparatus, in order to securely support a winding core of a medium at an appropriate position, movement of a holding unit for the medium is required to be regulated suitably. For example, in the printing apparatus in JP-A-2018-177410, a manually-driven handle is rotated to press a first abutment portion from one side, and thus the holding unit is fixed with respect to a rail portion. In the printing apparatus in JP-A-2016-203390, an operation unit is operated to move a movable member from one side, and thus the holding unit is fixed with respect to a guide shaft portion. However, in the mechanism in the related art, rigidity of each member is required to be increased so that the holding unit for the winding core is fixed with respect to a support unit for the holding unit with a stronger fixing force. As a result, the apparatus is increased in size. Therefore, in order to fix the holding unit for the winding core with respect to the support unit with a stronger fixing force, in other words, to securely support the winding core of the medium at an appropriate position while suppressing increase in size of the apparatus, a mechanism different from that in the related art is required.

SUMMARY

In order to solve the above-mentioned problem, a printing apparatus according to the present disclosure includes a printing unit configured to perform printing on a medium having an elongated shape, a holding unit including an insertion portion to be inserted into a winding core from an outside in an extending direction of the winding core, the winding core being any one of a first winding core of the medium being wound or a second winding core for winding the medium, a support unit being configured to support the holding unit and having a rail shape that allows the holding unit to move in a moving direction along an inserting direction of the insertion portion, and a regulation unit configured to regulate movement of the holding unit in the moving direction with respect to the support unit, wherein the regulation unit includes an operation unit and a braking unit configured to sandwich the support unit in a direction intersecting with the moving direction by operating the operation unit.

DESCRIPTION OF EMBODIMENT

Figure 1:
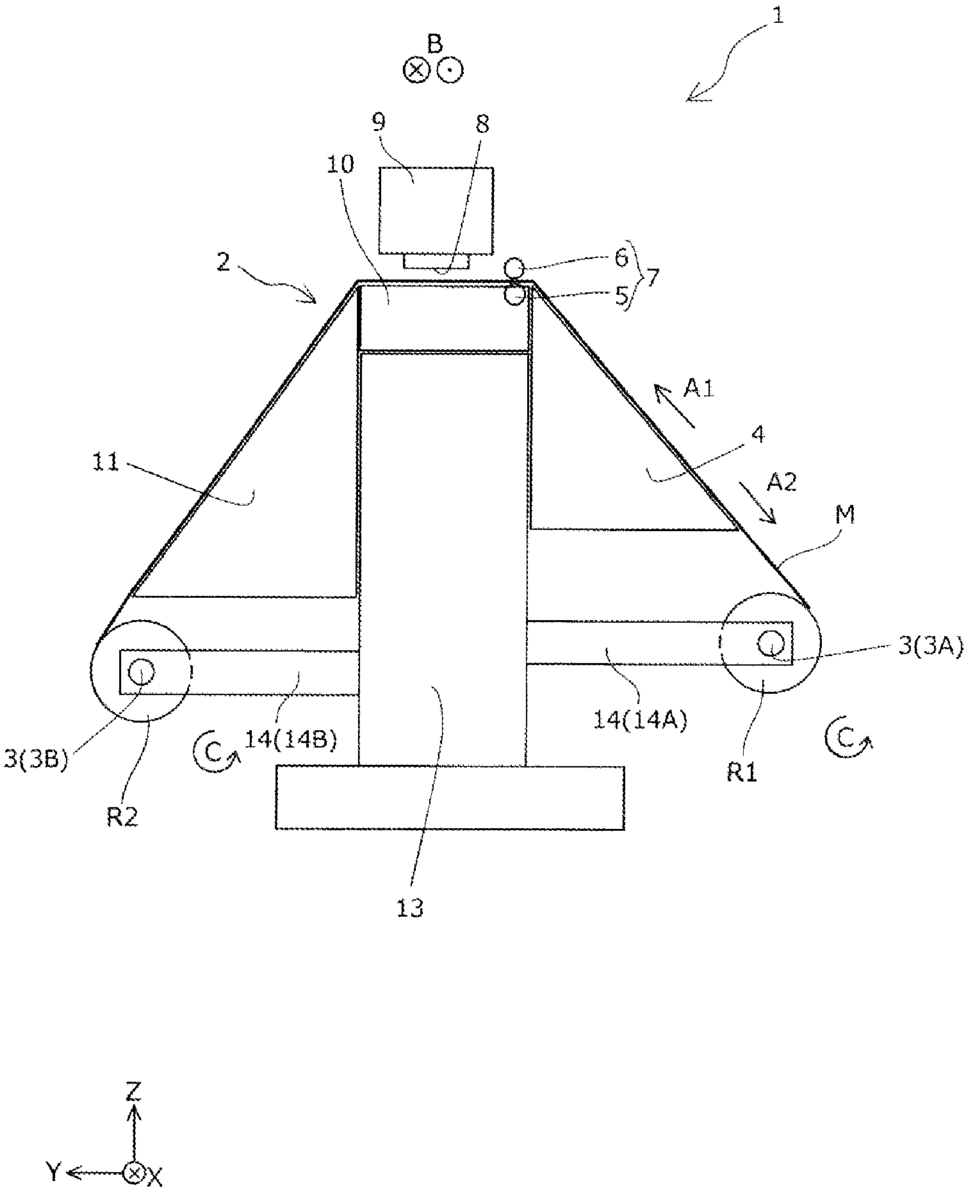
FIG. 1 is a schematic view of a printing apparatus according to an exemplary embodiment of the present disclosure.

First, the present disclosure is generally described.

In order to solve the above-mentioned problem, a printing apparatus according to a first aspect of the present disclosure includes a printing unit configured to perform printing on a medium having an elongated shape, a holding unit including an insertion portion to be inserted into a winding core from an outside in an extending direction of the winding core, the winding core being any one of a first winding core of the medium being wound or a second winding core for winding the medium, a support unit being configured to support the holding unit and having a rail shape that allows the holding unit to move in a moving direction along an inserting direction of the insertion portion, and a regulation unit configured to regulate movement of the holding unit in the moving direction with respect to the support unit, wherein the regulation unit includes an operation unit and a braking unit configured to sandwich the support unit in a direction intersecting with the moving direction by operating the operation unit.

According to the present aspect, there is included the regulation unit configured to regulate movement of the holding unit in the moving direction with respect to the support unit. The regulation unit includes the braking unit configured to sandwich the support unit in the direction intersecting with the moving direction of the holding unit. In other words, in place of a configuration in which pressing is performed toward the support unit only from one side, the barking unit includes a sandwiching configuration, that is, a configuration of pressing the support unit from both the sides facing each other, and hence movement of the holding unit with respect to the support unit can be regulated. Therefore, there is no particular need to improve rigidity of each member, and hence increase in size of the printing apparatus can be suppressed. Moreover, the braking unit including the sandwiching configuration enables regulation of movement of the holding unit with respect to the support unit in a preferred manner. With this, the winding core of the medium can be securely supported at an appropriate position.

In a printing apparatus according to a second aspect of the present disclosure, in the first aspect, the regulation unit is configured to move in conjunction with the holding unit with respect to the support unit.

According to the present aspect, the regulation unit is configured to move in conjunction with the holding unit with respect to the support unit. With such a configuration, in particular, the winding core of the medium can be securely supported at an appropriate position.

In a printing apparatus according to a third aspect of the present disclosure, in the first aspect or the second aspect, the support unit is arranged on a side of the printing unit with respect to the holding unit in a first direction orthogonal to the moving direction.

According to the present aspect, the support unit is arranged on the side of the printing unit with respect to the holding unit in the first direction orthogonal to the moving direction. With such a configuration, user operability is improved at the time of attaching the winding core.

In a printing apparatus according to a fourth aspect of the present disclosure, in the first aspect or the second aspect, the holding unit is attached rotatably with the support unit as a rotation axis.

According to the present aspect, the holding unit is attached rotatably with the support unit as a rotation axis. With such a configuration, user operability is improved at the time of attaching the winding core.

A printing apparatus according to a fifth aspect of the present disclosure, in the first aspect or the second aspect, includes a pair of legs to which ends of the support unit in the moving direction are attached, a coupling portion extending in the moving direction to couple the pair of legs to each other, and at least partially composed of a magnetic body, and an auxiliary regulation unit configured to regulate movement of the holding unit with respect to the support unit, wherein the auxiliary regulation unit includes a magnet provided at a position facing the magnetic body of the holding unit.

According to the present aspect, the auxiliary regulation unit includes a magnet provided at a position facing the magnetic body of the holding unit. Thus, with a simple configuration, movement of the holding unit with respect to the support unit can be regulated in a particularly preferred manner.

In a printing apparatus according to a sixth aspect of the present disclosure, in the first aspect or the second aspect, in the regulation unit, the operation unit and the braking unit are coupled to each other via a gear.

According to the present aspect, in the regulation unit, the operation unit and the braking unit are coupled to each other via a gear. With this, setting can be performed according to an apparatus to be used, by changing a gear ratio of a plurality of gears, for example, and thus user operability can particularly be improved.

In a printing apparatus according to a seventh aspect of the present disclosure, in the first aspect or the second aspect, when the holding unit includes a pair of holding units provided on both sides of the winding core in the extending direction, only one holding unit of the pair of holding units is configured to move in the moving direction with respect to the support unit, and the regulation unit regulates movement thereof in the moving direction with respect to the support unit.

According to the present aspect, only one holding unit of the pair of holding units is configured to move in the moving direction with respect to the support unit. Thus, the apparatus configuration can be simplified.

In a printing apparatus according to an eighth aspect of the present disclosure, in the first aspect or the second aspect, when the holding unit includes a pair of holding units provided on both sides of the winding core in the extending direction, both holding units of the pair of holding units are configured to move in the moving direction with respect to the support unit, and the regulation unit regulates movement thereof in the moving direction with respect to the support unit.

According to the present aspect, both the holding units of the pair of holding units are configured to move in the moving direction with respect to the support unit. Thus, according to the position of the printing unit or the like, the overall position of the winding core in the moving direction can be adjusted suitably.

Hereinafter, an exemplary embodiment of the present disclosure is specifically described with reference to the drawings. First, with reference to FIG. 1, an overview of a printing apparatus 1 according to an exemplary embodiment of the present disclosure is described. Note that, in FIG. 1, some component elements are omitted for clarity of the configuration. Here, in the drawings, an X-axis direction is a horizontal direction and a direction in which a pipe 19 described later extends. The pipe 19 is a support unit for a holding unit 3 that holds a roll body R1 obtained by winding a medium M into a roll shape. A Y-axis direction is a horizontal direction, a front-and-rear direction of the printing apparatus 1, and a direction orthogonal to the X-axis direction. A Z-axis direction is a vertical direction. Further, hereinafter, it is assumed that an arrow direction is a + direction, and a direction opposite to the arrow direction is a − direction. For example, it is assumed that a vertically upward direction is a +Z-direction, a vertically downward direction is a −Z-direction, a forward direction of the printing apparatus 1 is a +Y-direction, and a rearward direction of the printing apparatus 1 is a −Y-direction.

The printing apparatus 1 of the present exemplary embodiment includes a main body unit 2. Legs 13 are attached to both the end parts of the main body unit 2 in the X-axis direction. The legs 13 support a medium support unit 4, a medium support unit 10, and a medium support unit 11, which are described later. Further, the printing apparatus 1 of the present exemplary embodiment includes a first holding unit 3A as the holding unit 3 that holds the roll body R1 obtained by winding the medium M into a roll shape on the side in the −Y direction, which corresponds to the rear side of the main body unit 2. The first holding unit 3A functions as a feeding unit that feeds the medium M from the roll body R1 to the main body unit 2, and is provided to an arm 14 (arm 14A) attached to the pipe 19 (pipe 19A), which is described later, for coupling the legs 13 arranged on both the sides in the X-axis direction to each other.

Further, in the printing apparatus 1 of the present exemplary embodiment, when the medium M is transported in a first direction A1 being a transport direction, an insertion portion 15A that is provided to the first holding unit 3A and includes a rotation shaft along the X-axis direction rotates in a rotation direction C. The insertion portion 15A is a member to be inserted into a paper tube being a winding core (first winding core) of the roll body R1. Further, when the medium M is transported in a second direction A2 being a reverse transport direction opposite to the first direction A1, the insertion portion 15A including the rotation shaft along the X-axis direction rotates in a direction opposite to the rotation direction C. Note that, in the present exemplary embodiment, there is used the roll body R1 wound so that a printing surface on which an image is formed faces outward. When the roll body R1 wound so that the printing surface faces inward is used, the first holding unit 3A can rotate in the direction opposite to the rotation direction C to feed the medium M from the roll body R1.

Further, the printing apparatus 1 of the present exemplary embodiment includes a transport path of the medium M. The transport path includes the medium support unit 4, the medium support unit 10, and the medium support unit 11 that support the medium M, and the like. Further, the printing apparatus 1 includes a roller pair 7 including a driving roller 5 and driven rollers 6 in the transport path, as a transport unit that transports the medium M in the first direction A1 and the second direction A2. Note that, in the printing apparatus 1 of the present exemplary embodiment, the driving roller 5 is configured as a roller extending in a width direction B intersecting with the first direction A1 and the second direction A2. The driven rollers 6 are a plurality of rollers that are provided and arrayed in the width direction B with respect to the driving roller 5 at positions facing the driving roller 5. However, the configuration of the transport unit is not limited thereto.

Further, the printing apparatus 1 of the present exemplary embodiment includes a head 8 and a carriage 9 at a position facing the medium support unit 10. The head 8 is a printing unit that is provided with a plurality of nozzles and forms an image by ejecting ink from the nozzles. The carriage 9 is mounted with the head 8, and is reciprocally movable in the width direction B. Note that, in the printing apparatus 1 of the present exemplary embodiment, the first direction A1 at a position on the medium support unit 10 facing the head 8 is the +Y direction, the second direction A2 is the −Y direction, the width direction B being a moving direction of the head 8 is a direction along the X-axis direction, and an ink ejection direction is the −Z direction.

With the configuration described above, the head 8 is capable of forming an image by ejecting ink from the nozzles (not illustrated) onto the medium transported, while the head 8 reciprocates in the width direction B being a direction intersecting with the first direction A1 and the second direction A2. The printing apparatus 1 of the present exemplary embodiment is capable of forming a desired image on the medium M by repeating transport of the medium M by a predetermined transport amount in the first direction A1 and ejection of ink in a state in which the medium M is stopped while the head 8 moves in the width direction B. However, in place of the head thus configured, there may be adopted a configuration in which a so-called line head is included. In the line head, nozzles for ejecting ink are provided throughout in the X-axis direction.

Further, the holding unit 3 (second holding unit 3B) is provided downstream of the medium support unit 11 in the first direction A1. The holding unit 3 is a winding unit that winds the medium M transported in the first direction A1 into a roll shape to obtain a roll body R2. Note that, in the printing apparatus 1 of the present exemplary embodiment, the first holding unit 3A and the second holding unit 3B are configured similarly, and an insertion portion 15B provided to the second holding unit 3B, which is described later, rotates in the rotation direction C. The insertion portion 15B is a member to be inserted into a paper tube being a winding core (second winding core) of the roll body R2. The second holding unit 3B is provided to the arm 14 (arm 14B) attached to the pipe 19 (pipe 19B), which is described later, for coupling the legs 13 arranged on both the sides in the X-axis direction to each other. Note that, in FIG. 1, when the second holding unit 3B rotates in the rotation direction C, winding is performed so that a printing surface on which an image is formed faces outward. However, the medium M may be wound so that the printing surface faces inward. In such a case, the second holding unit 3B rotates in the direction opposite to the rotation direction C.

Figure 2:
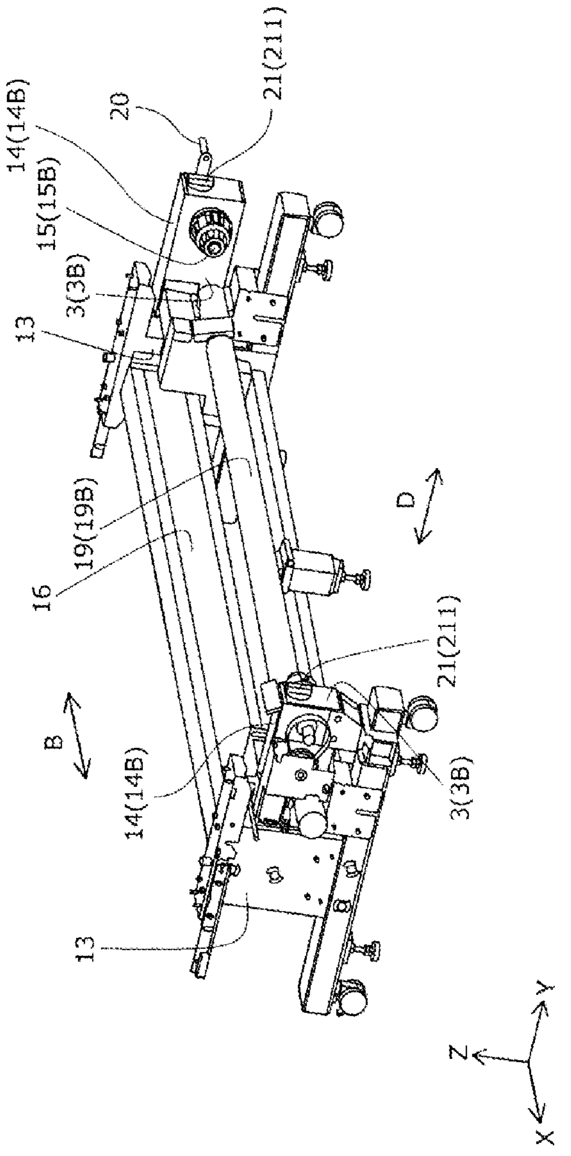
FIG. 2 is a perspective cross-sectional view illustrating peripheries of legs of the printing apparatus in FIG. 1.

With reference to FIG. 2 to FIG. 5, the main parts of the printing apparatus 1 of the present exemplary embodiment are described below in detail. Note that, as described above, the first holding unit 3A and the second holding unit 3B are configured similarly. Therefore, for easy understanding of the configuration, illustration in FIG. 2 is given while omitting the first holding unit 3A including the arm 14A.

Figure 3:
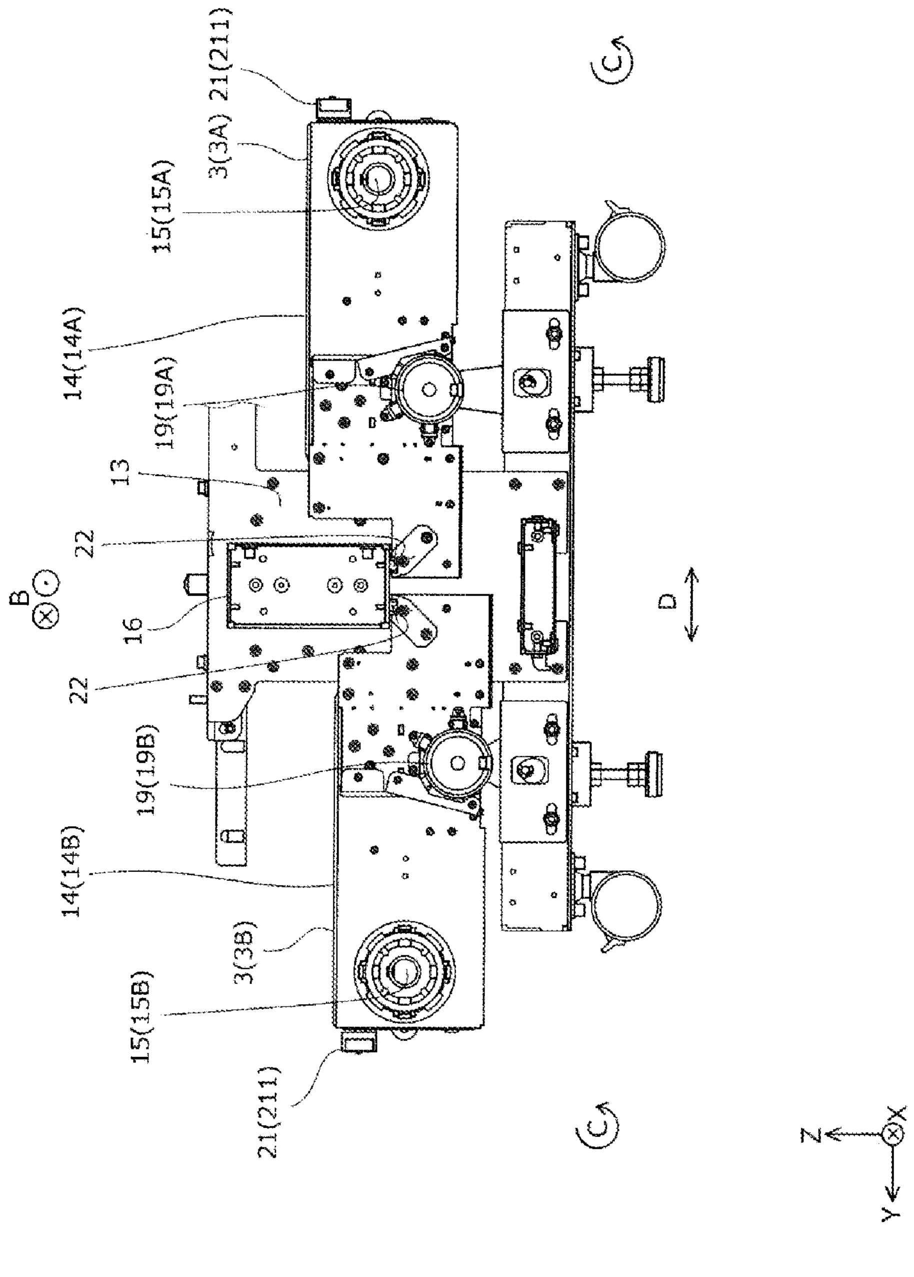
FIG. 3 is a perspective cross-sectional view illustrating the periphery of the leg of the printing apparatus in FIG. 1.

As illustrated in FIG. 3, the printing apparatus 1 of the present exemplary embodiment includes the head 8, the pair of first holding units 3A, and the pipe 19A. The head 8 performs printing on the medium M having an elongated shape. The pair of first holding units 3A include the insertion portion 15A being the insertion portion 15 to be inserted into the first winding core of the medium M being wound, from the outside in the X-axis direction being the extending direction of the first winding core. The pipe 19A being a support unit supports the first holding unit 3A, and has a rail shape that allows the first holding unit 3A to move in the X-axis direction and the width direction B that correspond to the moving direction along the inserting direction of the insertion portion 15A. Similarly, as illustrated in FIG. 2 and FIG. 3, the printing apparatus 1 of the present exemplary embodiment includes the pair of second holding units 3B and the pipe 19B. The pair of second holding units 3B include the insertion portion 15B to be inserted into the second winding core for winding the medium M from the outside in the X-axis direction being the extending direction of the second winding core. The pipe 19B being a support unit has a rail shape that allows the second holding unit 3B to move in the X-axis direction and the width direction B that correspond to the moving direction along the inserting direction of the insertion portion 15B.

Here, the pipe 19A is arranged on a side of the head 8 (a side in the +Y direction) in a first direction D with respect to the first holding unit 3A. The first direction D is a direction along the Y-axis direction of the directions orthogonal to the extending direction of the first winding core, and is a direction substantially along the direction from the holding unit 3 to the pipe 19. Similarly, the pipe 19B is arranged on a side of the head 8 (a side in the −Y direction) in the first direction D with respect to the second holding unit 3B. In other words, the holding unit 3 is arranged outside of the pipe 19. With such a configuration, user operability is improved at the time of attaching the winding core.

Figure 4:
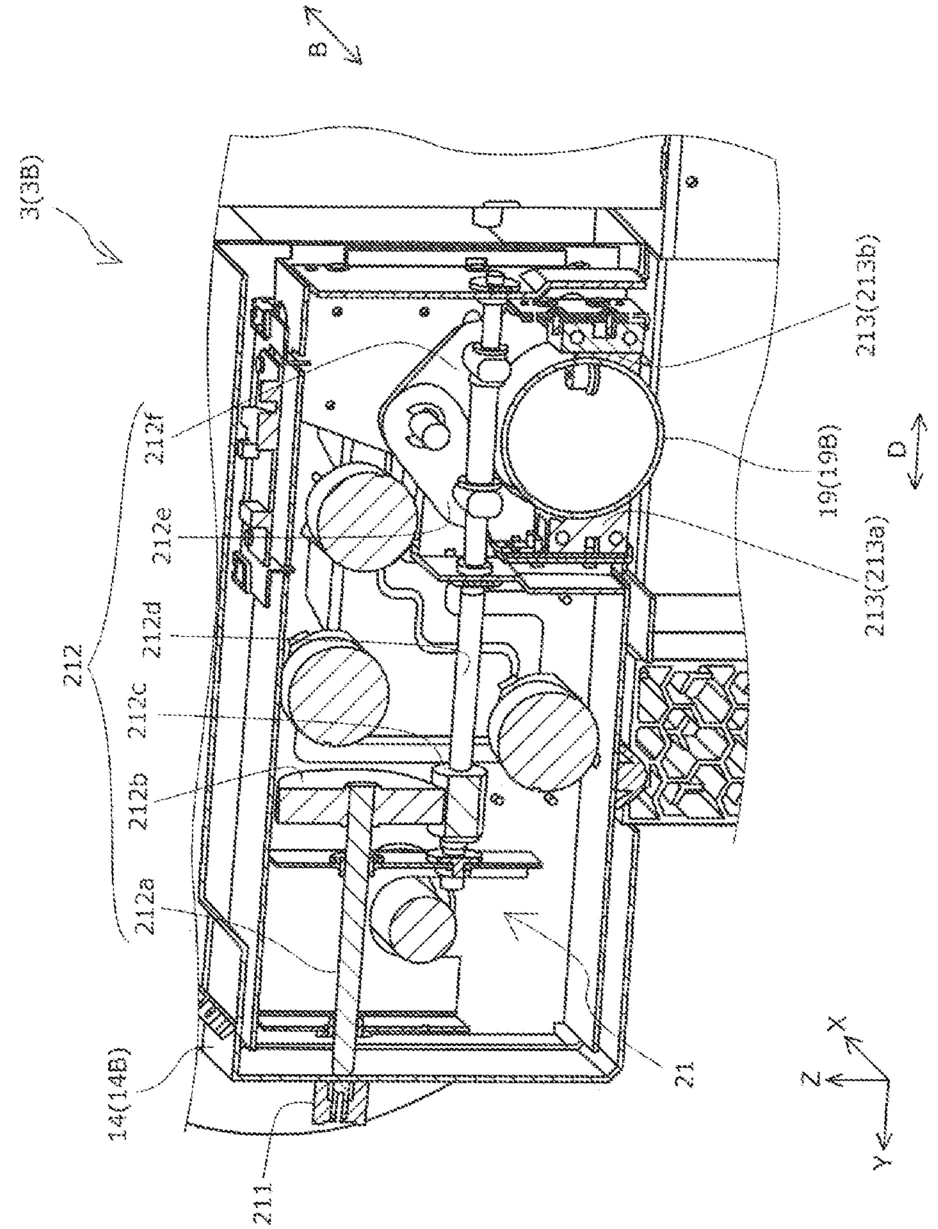
FIG. 4 is a perspective cross-sectional view illustrating a periphery of a holding unit of the printing apparatus in FIG. 1.

Here, as illustrated in FIG. 4 and the like, the printing apparatus 1 of the present exemplary embodiment includes a regulation unit 21 that regulates movement of the holding unit 3 in the width direction B being the moving direction with respect to the pipe 19. Further, as illustrated in FIG. 4, the regulation unit 21 includes an operation unit 211 and a braking unit 213. The braking unit 213 sandwiches the pipe 19 in the first direction D being a direction intersecting with the width direction B by operating the operation unit 211. In other words, the printing apparatus 1 of the present exemplary embodiment includes the braking unit 213 including a sandwiching configuration, that is, a configuration of pressing the pipe 19 from both the sides facing each other, in place of a configuration in which pressing is performed toward the pipe 19 only from one side. Further, the printing apparatus 1 of the present exemplary embodiment is configured so that the braking unit 213 enables regulation of movement of the holding unit 3 with respect to the pipe 19.

Therefore, in the printing apparatus 1 of the present exemplary embodiment, there is no particular need to improve rigidity of each of the members such as the regulation unit 21 and the pipe 19, and hence increase in size of the printing apparatus can be suppressed. Moreover, as described above, in the printing apparatus 1 of the present exemplary embodiment, the braking unit 213 including the sandwiching configuration enables regulation of movement of the holding unit 3 with respect to the pipe 19 in a preferred manner. With this, the winding core of the medium M can be securely supported at an appropriate position. Note that, in the printing apparatus 1 of the present exemplary embodiment, the first holding unit 3A capable of holding the winding core (the first winding core) of the roll body R1 being a roll of the medium M before printing is performed and the second holding unit 3B capable of holding the wiring core (the second winding core) for winding the medium M on which printing is performed are similarly configured. Both the units include the configuration described above. However, only any one of those is required to be configured as described above.

Here, as illustrated in FIG. 4 and the like, in the printing apparatus 1 of the present exemplary embodiment, the regulation unit 21 is provided to the holding unit 3. In other words, the regulation unit 21 is configured to move in conjunction with the holding unit 3 with respect to the pipe 19. Similar to the printing apparatus 1 of the present exemplary embodiment, the regulation unit 21 is configured to move in conjunction with the holding unit 3 with respect to the pipe 19. With this, in particular, the winding core of the medium M can be securely supported at an appropriate position. Note that, in the printing apparatus 1 of the present exemplary embodiment, the regulation unit 21 is provided to the holding unit 3 so that the regulation unit 21 is movable in conjunction with the holding unit 3 with respect to the pipe 19. However, the regulation unit 21 and the holding unit may be provided as separate bodies, and the regulation unit 21 may be movable in conjunction with the holding unit 3 with respect to the pipe 19.

Here, as illustrated in FIG. 2 to FIG. 4, in the printing apparatus 1 of the present exemplary embodiment, the pipe 19 has a cylindrical shape, and a cross-sectional shape thereof is circular. Thus, the holding unit 3 is rotatable in the rotation direction C and the direction opposite to the rotation direction C with the pipe 19 as a rotation axis. In this manner, a configuration in which the holding unit 3 is attached rotatably with the pipe 19 as a rotation axis is adopted. With this, the holding unit 3 can easily move along the width direction B with respect to the pipe 19, according to the length of the winding core of the medium M, and user operability is improved at the time of attaching the winding core of the medium M.

Note that, as illustrated in FIG. 2, the printing apparatus 1 of the present exemplary embodiment includes a manually-driven handle 20 capable of adjusting a protrusion amount of the insertion portion 15 from the arm 14 in the width direction B. A user rotates the manually-driven handle 20 to change the protrusion amount of the insertion portion 15 in the width direction B. With this, the insertion portion 15 can easily be inserted into the winding core of the medium M. Here, FIG. 2 is a cross-sectional view, and hence the manually-driven handle 20 is not illustrated in the holding unit 3 on the side in the +X direction. However, the holding unit 3 on the side in the +X direction is configured similarly to the holding unit 3 on the side in the –X direction. In actuality, the holding unit 3 on the side in the +X direction is also provided with the manually-driven handle 20.

Further, as illustrated in FIG. 2, the printing apparatus 1 of the present exemplary embodiment includes the pair of legs 13 to which the ends of the pipe 19 in the width direction B are attached and a stay 16 being a coupling portion that is provided to extend in the width direction B to couple the pair of legs 13 to each other. Here, the stay 16 has an outer circumferential part formed of metal being a magnetic body. Further, as illustrated in FIG. 3 and FIG. 5, the printing apparatus 1 of the present exemplary embodiment includes an auxiliary regulation unit 22 at a position of the holding unit 3 that contacts with the outer circumferential part of the stay 16.

The auxiliary regulation unit 22 of the present exemplary embodiment, which is illustrated in FIG. 3 and the like has a function of regulating rotation of the holding unit 3 in the rotation direction C and the direction opposite to the rotation direction C with respect to the pipe 19 and movement thereof in the width direction B. Specifically, as illustrated in FIG. 5, a magnet 221 that attracts the outer circumferential part is provided at a position of the holding unit 3 that faces the outer circumferential part configured by the magnetic body of the stay 16. In this manner, the printing apparatus 1 of the present exemplary embodiment includes the auxiliary regulation unit 22 thus configured, in addition to the regulation unit 21. Thus, with a simple configuration, movement of the holding unit 3 with respect to the pipe 19, which is not intended by a user, can be regulated in a particularly preferred manner.

Figure 5:
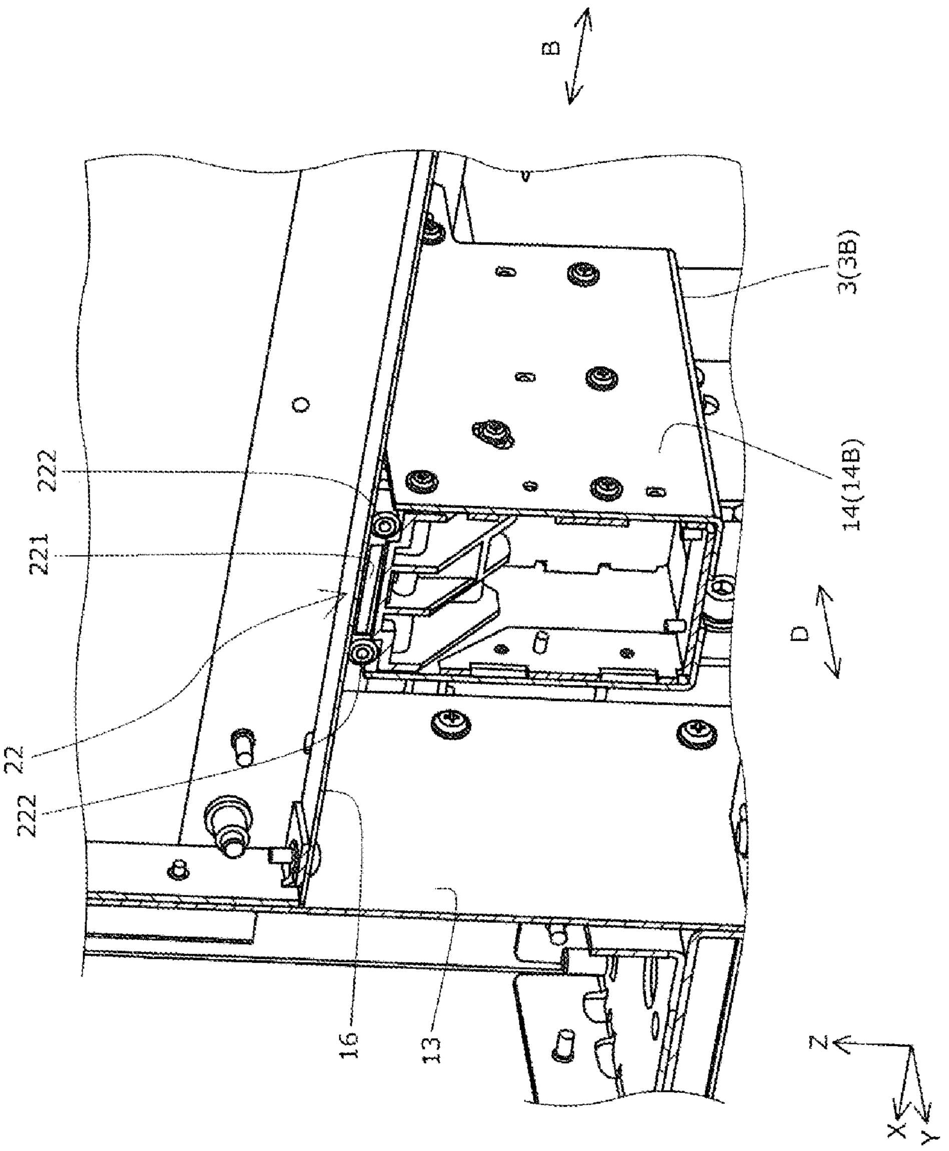
FIG. 5 is a perspective cross-sectional view illustrating the periphery of the holding unit of the printing apparatus in FIG. 1, which is viewed from an angle different from that in FIG. 4, and is a cross-sectional view at a position different from that in FIG. 4.

Note that, as illustrated in FIG. 5, the auxiliary regulation unit 22 of the present exemplary embodiment is provided with rollers 222 on both sides of the magnet 221. The rollers 222 have a function of assisting movement of the holding unit 3 in a direction along the width direction B when a predetermined or greater force in the direction along the width direction B (a force exceeding an attraction force of the magnet 221 with respect to the outer circumferential part) is applied to the auxiliary regulation unit 22. Thus, when a user causes the holding unit 3 to hold the winding core of the medium M, the holding unit 3 can easily move along the width direction B with respect to the pipe 19, according to the length of the winding core of the medium M.

Further, as illustrated in FIG. 4, the regulation unit 21 of the present exemplary embodiment includes a gear unit 212, in addition to the operation unit 211 and the braking unit 213. In other words, in the regulation unit 21 of the present exemplary embodiment, the operation unit 211 and the braking unit 213 are coupled to each other via gears. With such a configuration, for example, setting can be performed according to an apparatus to be used, by changing a gear ratio of a plurality of gears constituting the gear unit 212, and thus user operability can particularly be improved.

Specifically, as illustrated in FIG. 4, the regulation unit 21 of the present exemplary embodiment includes a first shaft 212*a* coupled to the operation unit 211, and the first shaft 212*a* is provided with a large-diameter gear 212*b* having a large diameter. The large-diameter gear 212*b* is meshed with a small-diameter gear 212*c*, and the small-diameter gear 212*c* is provided to a second shaft 212*d*. The second shaft 212*d* extends in an extending direction being the first direction D (the Y-axis direction), and the extending direction of the second shaft 212*d* and the extending direction of the first shaft 212*a* match with each other. A first fixing portion 212*e* and a second fixing portion 212*f* are attached to the second shaft 212*d*. A first braking portion 213*a* of the braking unit 213 is fixed to the first fixing portion 212*e*, and A second braking portion 213*b* of the braking unit 213 is fixed to the second fixing portion 212*f*.

Further, a user operates the operation unit 211 to rotate the operation unit 211 with the first shaft 212*a* as a rotary shaft. As the first shaft 212*a* rotates, the large-diameter gear 212*b* rotates. The small-diameter gear 212*c* meshed with the large-diameter gear 212*b* rotates. Then, the second shaft 212*d* rotates. When the second shaft 212*d* rotates, attachment parts of the first fixing portion 212*e* and the second fixing portion 212*f* with respect to the second shaft 212*d* move along the extending direction (the first direction D) of the second shaft 212*d*. Here, the attachment part of each of the first fixing portion 212*e* and the second fixing portion 212*f* with respect to the second shaft 212*d* is configured to move in a direction opposite to the first direction D as the second shaft 212*d* rotates. Specifically, when a user rotates the operation unit 211 in a clockwise direction, the attachment part of the first fixing portion 212*e* with respect to the second shaft 212*d* moves in the −Y direction, and the attachment part of the second fixing portion 212*f* with respect to the second shaft 212*d* moves in the +Y direction. In contrast, when a user rotates the operation unit 211 in an anti-clockwise direction, the attachment part of the first fixing portion 212*e* with respect to the second shaft 212*d* moves in the +Y direction, and the attachment part of the second fixing portion 212*f* with respect to the second shaft 212*d* moves in the −Y direction.

The regulation unit 21 of the present exemplary embodiment is thus configured. With this, when a user rotates the operation unit 211 in one of the rotation directions (the clockwise direction), the braking unit 213 sandwiches the pipe 19. When a user rotates the operation unit 211 in the other one of the rotation directions (the counterclockwise direction), the braking unit 213 is separated away from the pipe 19. The regulation unit 21 is thus configured. With this, for example, when the gear ratio of the large-diameter gear 212*b* with respect to the small-diameter gear 212*c* is increased, an operation force for operating the operation unit 211 by a user can be reduced. When the gear ratio of the large-diameter gear 212*b* with respect to the small-diameter gear 212*c* is reduced, a rotation amount for operating the operation unit 211 by a user can be reduced. Note that, in the regulation unit 21 of the present exemplary embodiment, the rotary shaft of the operation unit 211 in the rotation direction corresponds to the Y-axis direction (the first direction D), and the rotation amount of the operation unit 211 for sandwiching the pipe 19 between the braking unit 213 is a half rotation to one rotation.

Here, in the printing apparatus 1 of the present exemplary embodiment, in any cases of the first holding unit 3A and the second holding unit 3B, there is adopted a configuration in which both of the units in the pair of holding units 3 are movable in the width direction B with respect to the pipe 19. Further, in any cases of the first holding unit 3A and the second holding unit 3B, there is adopted a configuration in which the regulation unit 21 regulates movement of both of the units in the pair of holding units 3 in the width direction B with respect to the pipe 19. Thus, in the printing apparatus 1 of the present exemplary embodiment, according to the position of the head 8 or the like, the overall position of the winding core in the width direction B can be adjusted suitably.

However, the present disclosure is not limited to such a configuration. In a case of at least one of the first holding unit 3A and the second holding unit 3B, there may be adopted a configuration in which only one unit in the pair of holding units 3 is movable in the width direction B with respect to the pipe 19. Further, there may be adopted a configuration in which movement of only the one unit in the pair of holding units 3, which is movable in the width direction B, in the width direction B with respect to the pipe 19 is regulated by the regulation unit 21. With such a configuration, the apparatus configuration can be simplified.

The present disclosure is not limited to the above-described exemplary embodiment, and can be realized in various configurations without departing from the spirit of the present disclosure. Further, technical characteristics in the exemplary embodiment corresponding to technical characteristics in the respective aspects described in Summary can be substituted or combined appropriately in order to solve some or all of the above-described problems or to achieve some or all of the above-described effects. Further, when the technical characteristics are not described as being essential in the present specification, the technical characteristics can be deleted appropriately.

What is claimed is:

1. A printing apparatus, comprising:

a printing unit configured to perform printing on a medium having an elongated shape;

a holding unit including an insertion portion to be inserted into a winding core from an outside in an extending direction of the winding core, the winding core being any one of a first winding core of the medium being wound or a second winding core for winding the medium;

a support unit being configured to support the holding unit and having a rail shape that allows the holding unit to move in a moving direction along an inserting direction of the insertion portion; and a regulation unit configured to regulate movement of the holding unit in the moving direction with respect to the support unit, wherein the regulation unit includes an operation unit and a braking unit configured to sandwich the support unit in a direction intersecting with the moving direction by operating the operation unit such that the braking unit provides a pressing force to both sides of the support unit, the braking unit has a first braking portion and a second braking portion, and the first braking portion and the second braking portion are moved by operating the operation unit.

2. The printing apparatus according to claim 1, wherein the regulation unit is configured to move in conjunction with the holding unit with respect to the support unit.

3. The printing apparatus according to claim 1, wherein the support unit is arranged on a side of the printing unit with respect to the holding unit in a first direction orthogonal to the moving direction.

4. The printing apparatus according to claim 3, wherein the first direction is orthogonal to a vertical direction.

5. The printing apparatus according to claim 1, wherein the holding unit is attached rotatably with the support unit as a rotation axis.

6. The printing apparatus according to claim 1, comprising:

a pair of legs to which ends of the support unit in the moving direction are attached;

a coupling portion extending in the moving direction to couple the pair of legs to each other, and at least partially composed of a magnetic body; and an auxiliary regulation unit configured to regulate movement of the holding unit with respect to the support unit, wherein the auxiliary regulation unit includes a magnet provided at a position facing the magnetic body of the holding unit.

7. The printing apparatus according to claim 1, wherein in the regulation unit, the operation unit and the braking unit are coupled to each other via a gear.

8. The printing apparatus according to claim 1, wherein only one holding unit of the pair of holding units provided on both sides of the winding core in the extending direction is configured to move in the moving direction with respect to the support unit, and the regulation unit regulates movement of the one holding unit in the moving direction with respect to the support unit.

9. The printing apparatus according to claim 1, wherein the holding unit comprises a pair of holding units, wherein both holding units of the pair of holding units provided on both sides of the winding core in the extending direction are configured to move in the moving direction with respect to the support unit, and the regulation unit regulates movement of the holding units in the moving direction with respect to the support unit.

10. The printing apparatus according to claim 1, wherein the first braking portion and the second braking portion move in opposite directions by operating the operation unit.

11. A printing apparatus, comprising:

a printing unit configured to perform printing on a medium having an elongated shape;

a holding unit including an insertion portion to be inserted into a winding core from an outside in an extending direction of the winding core, the winding core being any one of a first winding core of the medium being wound or a second winding core for winding the medium;

a support unit being configured to support the holding unit and having a rail shape that allows the holding unit to move in a moving direction along an inserting direction of the insertion portion; and a regulation unit configured to regulate movement of the holding unit in the moving direction with respect to the support unit, wherein the regulation unit includes an operation unit and a braking unit configured to sandwich the support unit in a direction intersecting with the moving direction by operating the operation unit, and the holding unit is attached rotatably with the support unit as a rotation axis.

12. The printing apparatus according to claim 11, wherein the regulation unit is configured to move in conjunction with the holding unit with respect to the support unit.

13. The printing apparatus according to claim 11, wherein the support unit is arranged on a side of the printing unit with respect to the holding unit in a first direction orthogonal to the moving direction.

14. The printing apparatus according to claim 11, wherein the holding unit comprises a pair of holding units, wherein both holding units of the pair of holding units provided on both sides of the winding core in the extending direction are configured to move in the moving direction with respect to the support unit, and the regulation unit regulates movement of the holding units in the moving direction with respect to the support unit.

15. A printing apparatus, comprising:

a printing unit configured to perform printing on a medium having an elongated shape;

a holding unit including an insertion portion to be inserted into a winding core from an outside in an extending direction of the winding core, the winding core being any one of a first winding core of the medium being wound or a second winding core for winding the medium;

a support unit being configured to support the holding unit and having a rail shape that allows the holding unit to move in a moving direction along an inserting direction of the insertion portion;

a regulation unit configured to regulate movement of the holding unit in the moving direction with respect to the support unit;

a pair of legs to which ends of the support unit in the moving direction are attached;

a coupling portion extending in the moving direction to couple the pair of legs to each other, and at least partially composed of a magnetic body; and an auxiliary regulation unit configured to regulate movement of the holding unit with respect to the support unit, wherein the regulation unit includes an operation unit and a braking unit configured to sandwich the support unit in a direction intersecting with the moving direction by operating the operation unit, and the auxiliary regulation unit includes a magnet provided at a position facing the magnetic body of the holding unit.

16. The printing apparatus according to claim 15, wherein the regulation unit is configured to move in conjunction with the holding unit with respect to the support unit.

17. The printing apparatus according to claim 15, wherein the support unit is arranged on a side of the printing unit with respect to the holding unit in a first direction orthogonal to the moving direction.

18. The printing apparatus according to claim 15, wherein the holding unit comprises a pair of holding units, wherein both holding units of the pair of holding units provided on both sides of the winding core in the extending direction are configured to move in the moving direction with respect to the support unit, and the regulation unit regulates movement of the holding units in the moving direction with respect to the support unit.

* * * * *